US011128798B2

(12) United States Patent
Chang (10) Patent No.: US 11,128,798 B2
(45) Date of Patent: Sep. 21, 2021

(54) DISPLAY DEVICE AND CONTROL METHOD THEREOF

(71) Applicant: ASUSTeK COMPUTER INC., Taipei (TW)

(72) Inventor: Yo-Lin Chang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/944,284

(22) Filed: Jul. 31, 2020

(65) Prior Publication Data
US 2021/0051268 A1 Feb. 18, 2021

(30) Foreign Application Priority Data
Aug. 13, 2019 (TW) ................................ 108128789

(51) Int. Cl.
*H04N 5/232* (2006.01)
*H04N 7/12* (2006.01)
*H04N 17/00* (2006.01)

(52) U.S. Cl.
CPC ..... *H04N 5/23245* (2013.01); *H04N 5/23203* (2013.01); *H04N 7/12* (2013.01); *H04N 17/002* (2013.01)

(58) Field of Classification Search
CPC .. H04N 5/23245; H04N 5/23203; H04N 7/12; H04N 17/002; H04N 7/14; H04N 5/225

USPC ......................................................... 348/164
See application file for complete search history.

(56) References Cited

U.S. PATENT DOCUMENTS

| 8,547,413 | B2 | 10/2013 | Choi | |
|---|---|---|---|---|
| 10,015,356 | B2 * | 7/2018 | Hori | ................... H04N 1/32502 |
| 10,769,094 | B2 * | 9/2020 | Frederick | ................ G06F 13/38 |
| 2011/0085046 | A1 * | 4/2011 | Seo | ......................... H04N 7/147 |
| | | | | 348/207.1 |

FOREIGN PATENT DOCUMENTS

| CN | 102783141 A | 11/2012 |
|---|---|---|
| CN | 109033913 A | 12/2018 |

\* cited by examiner

*Primary Examiner* — Trang U Tran
(74) *Attorney, Agent, or Firm* — McClure, Qualey & Rodack, LLP (57) ABSTRACT

A display device and controlling method thereof are provided. The display device includes a connecting port, an image capture module, and a data exchange module. The image capture module is configured to generate image data, and the data exchange module has a data transmission bandwidth. The controlling method comprises following steps of: generating image data with a first resolution by the image capture module when the computer host is electrically connected to the connecting port and executes a login procedure; and generating the image data with a second resolution by the image capture module when the computer host ends the login procedure; wherein the first resolution is lower than the second resolution.

11 Claims, 5 Drawing Sheets

DISPLAY DEVICE AND CONTROL METHOD THEREOF

CROSS-REFERENCE TO RELATED APPLICATION

This application claims the priority benefit of Taiwan applications serial No. 108128789, filed on Aug. 13, 2019. The entirety of the above-mentioned patent application is hereby incorporated by reference herein and made a part of specification.

BACKGROUND OF THE INVENTION

Field of the Invention

The invention relates to a display technology, in particular to a display device integrating an image display function and an image capture function and a control method.

Description of the Related Art

More and more applications or hardware of electronic devices utilize camera functions. For example, an image capturing function utilizes camera and show the image result on the display. However, while integrating the cameras with displays, some hardware implementation problems rises while the application is under operated. Each application is triggered with its specific operating conditions, such as handshake protocol or to enable the built-in components of the camera. Therefore, the transmission bandwidth of the system is usually not enough to support all conditions, which makes the entire application inoperable.

BRIEF SUMMARY OF THE INVENTION

According to the first aspect, a display device is provided. The display device comprises: a connecting port, for electrically connecting to a computer host; an image capture module, for generating a image data; and a data exchange module, electrically connected between the image capture module and the connecting port, the data exchange module has a data transmission bandwidth; wherein, when the computer host is electrically connected with the connecting port and executes a login procedure, the image capture module generates the image data with a first resolution; when the computer host ends the login procedure, the image capture module is switched to generate the image data with a second resolution, wherein the first resolution is lower than the second resolution.

According to the second aspect, a controlling method applied in a computer host and a display device is provided. The display device includes a connecting port, an image capture module, and a data exchange module, the connecting port is configured to be electrically connected with a computer host, the data exchange module is electrically connected between the image capture module and the connecting port, the data exchange module has a data transmission bandwidth. The controlling method comprises steps of: generating image data with a first resolution by the image capture module when the computer host is electrically connected to the connecting port and executes a login procedure; and generating the image data with a second resolution by the image capture module when the computer host ends the login procedure; wherein the first resolution is lower than the second resolution.

These and other features, aspects and advantages of the present invention will become better understood with regard to the following description, appended claims, and accompanying drawings.

DETAILED DESCRIPTION OF THE EMBODIMENTS

The following is a detailed description with embodiments and drawings to better understand the aspect of the disclosure, but the embodiments provided are not intended to limit the scope of the disclosure, and the description of structural operations is not intended to limit the order in which they are performed. A device with equal efficacy made of any structure that is recombined with components is in the scope of the disclosure. In addition, according to industry standards and common practices, the drawings are only for the purpose of describing, and are not exactly in accordance with the original dimensions. In fact, the dimensions of various features can be increased or decreased for easy explanation. In the following description, the same elements will be described with the same symbols to facilitate understanding.

In addition, the terms used in this article "include", "comprise", "have", "contain", etc. are all open-ended terms, which mean "include but not limited to." In addition, "and/or" as used herein includes any one or more of the listed items and all combinations thereof.

In this disclosure, when a component is called "connected" or "coupled", it means "electrically connected" or "electrically coupled". "Connected" or "coupled" can also be used to indicate that two or more components operate together or interact with each other. In addition, although the terms "first", "second", etc. are used to describe different elements, the term is only used to distinguish elements or operations described in the same technical term. Unless the context clearly indicates, otherwise, the terms are not specifically referring to or implying order or priority, nor is it intended to limit the invention.

In this disclosure, a "bandwidth" or "transmission bandwidth" is the amount of data transmitted by the component in electronic communications, which can be used to represent the amount of data per unit time. When the "bandwidth" or "transmission bandwidth" is small or large, it means that the data transmission amount per unit time is small or large, so the same data amount has a short or a long transmission time.

Figure 1:
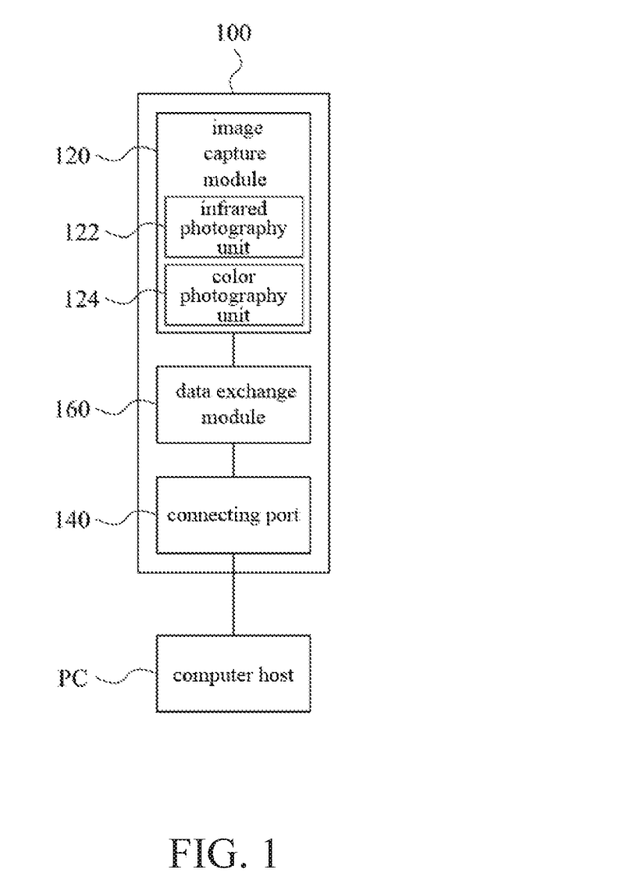
FIG. 1 shows a block diagram of a display device according to an embodiment.

FIG. 1 shows a block diagram of a display device according to an embodiment of the present disclosure. The actual display device contains more physical structures or circuits, which are not shown in the figure.

In an embodiment, as shown in FIG. 1, a display device 100 includes an image capture module 120, a connecting port 140, and a data exchange module 160. The connecting port 140 is configured to electrically connecting to a computer host PC. The data exchange module 160 is electrically connected between the image capture module 120 and the connecting port 140.

In an embodiment, the image capture module 120 generates image data. In an embodiment, the image capture module 120 is a webcam, which supports video calls or monitoring functions. In an embodiment, the image data is a picture or a video, and the specific format or the encoding of the image data is not limited here. In one embodiment, the image capture module 120 includes an infrared photography unit 122 and a color photography unit 124. In one embodiment, the infrared photography unit 122 and the color photography unit 124 are the same lens disposed in the image capture module 120. In one embodiment, the infrared photography unit 122 and the color photography unit 124 are different lenses disposed in the image capture module 120. The infrared photography unit 122 and the color photography unit 124 are photosensitive coupling elements with different filters, and the implementation of the infrared photography unit 122 and the color photography unit 124 is not limited herein.

Generally, the image data generated by the infrared photography unit 122 is an infrared grayscale image, and the image data generated by the color photography unit 124 is a full-color image. In an embodiment, the full-color image is composed of three colors of red, green, and blue (RGB) or a luminance chroma color gamut (YCbCr). In one embodiment, the resolution of the infrared grayscale image is lower than the resolution of the full-color image. In other words, the amount of data in the infrared grayscale image generated by the infrared photography unit 122 is less than the amount of data in the full-color image generated by the color photography unit 124.

In addition, the display device 100 further includes a display panel (not shown) and a driving circuit (not shown). When the display device 100 is electrically connected to the computer host PC, the display panel and the driving circuit provide a display image. Relevant details are already known to persons skilled in the art, the detailed description of which is thus no longer repeated here. In this way, the display device 100 integrates image display and image capture functions.

The data exchange module 160 includes a universal serial bus hub integrated circuit such as a USB hub IC (Integrated Circuit). In an embodiment, the data exchange module 160 transmits data of related components in the display device 100 to the computer host PC, and transmits data provided by the computer host PC to the corresponding related components in the display device 100.

In an embodiment, to correspond to the data exchange module 160, the connecting port 140 is designed to support the universal serial bus hub protocol specifications.

In the embodiment shown in FIG. 1, the data exchange module 160 defines a data transmission bandwidth. In one embodiment, the size of the data transmission bandwidth of the data exchange module 160 is preset. In an embodiment, the size of the data transmission bandwidth of the data exchange module 160 is determined according to transmission specifications supported by other components connected to the data exchange module 160. In an embodiment, when the data exchange module 160 supports USB 3.0 transmission specification but the image capture module 120 only supports USB 2.0 transmission specification, the data transmission bandwidth of the data exchange module 160 is backward compatible and is defined as 480 Mega-bits (Mbps) per second; when both the data exchange module 160 and the image capture module 120 support the USB 3.0 transmission specification, the data transmission bandwidth of the data exchange module 160 is defined as 5 Giga-bits (Gbps) per second. The above is just an example and is not limited herein.

When the program executed by the operating system of the computer host PC cooperates with the image capture module 120 via the data exchange module 160, the operating system of the computer host PC and the image capture module 120 occupy at least a part of the data transmission bandwidth for communicating or data exchanging. The requirement of the data transmission bandwidth and detailed bandwidth resource allocated by the operating system for certain programs are preset by the system, and cannot be changed by developers of other systems or devices, which increases the difficulty of related research and development. For example, the face recognition program of Windows Hello proposed by Microsoft requires the image capture module 120 for users to log in to a personal computer account through face recognition alternatively. However, Windows Hello includes many detailed features and communication details that are not changeable by other developers.

Taking Windows Hello as an example, the image capture module 120 captures a face image as image data, and provides the image data to the computer host PC for face recognition operations. The transmission of the image data requires a portion of the data transmission bandwidth. On the other hand, since the image capture module 120 also performs a handshake with the computer host PC or other data transmission with the computer host PC to exchange control information, a portion of the data transmission bandwidth is occupied. Therefore, the image capture module 120 cannot use the full data transmission bandwidth to transmit the image data. In other words, since the data transmission bandwidth may not be enough for the image capture module 120 to transmit the image data when the login procedure is executed, the image capture module 120 cannot transmit the image data within a predetermined time and causes an error in the Windows Hello program.

In an embodiment, other components of the display device 100 also occupy a part of the data transmission bandwidth. In an embodiment, the image capture module 120 includes an audio collecting component (not shown in FIG. 1). The audio collecting component is a microphone for receiving voice and providing audio data accordingly. In one embodiment, the display device 100 includes an audio collecting component or other components for receiving voice and providing the audio data accordingly. In an embodiment, when the audio collecting component or other components are electrically connected to the data exchange module 160 to transmit the audio data, a portion of the data transmission bandwidth is occupied, thereby affecting the actual bandwidth that is provided for the image capture module 120 to transmit the image data. However, in this disclosure, the image data or other data (such as the audio data) is completely exchanged within a predetermined time.

Figure 2:
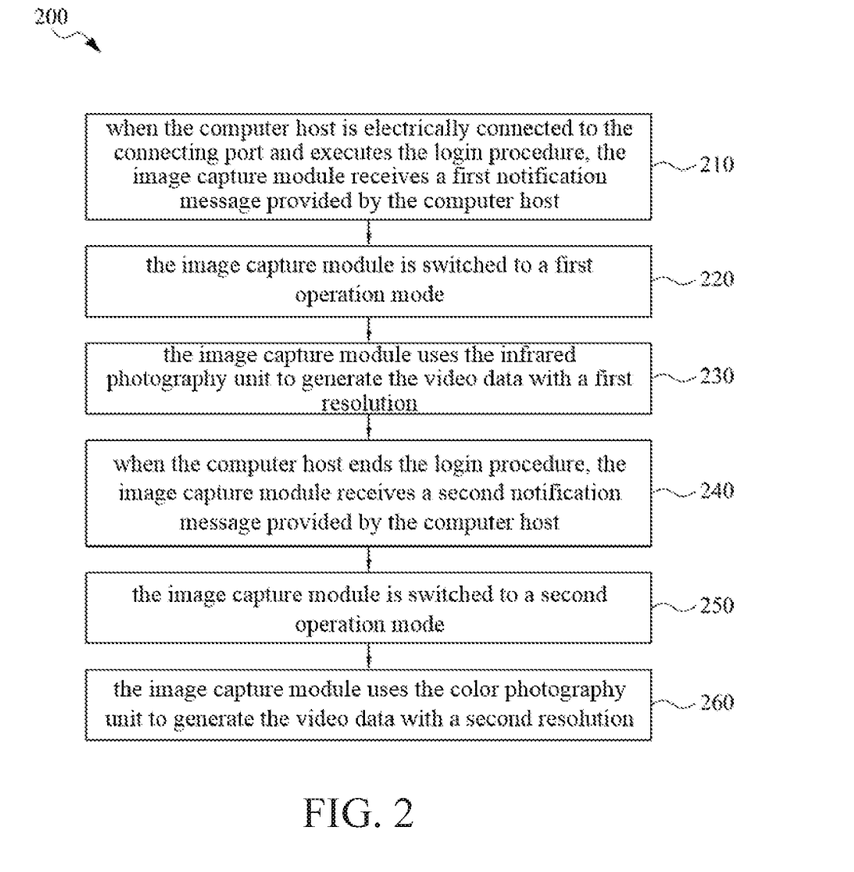
FIG. 2 shows a flowchart of a controlling method of an embodiment.

Please also refer to FIG. 2. FIG. 2 shows a flowchart of a controlling method of an embodiment of the present disclosure.

In step 210, when the computer host PC is electrically connected to the connecting port 140 and executes the login procedure, the image capture module 120 receives a first notification message provided by the computer host PC. In an embodiment, the first notification message is used to inform the image capture module 120 that the computer host PC is going to execute the login procedure or already starts to execute the login procedure.

Then, in step 220, the image capture module 120 is switched to a first operation mode. In one embodiment, the first operation mode is an infrared (IR) mode.

In step 230, the image capture module 120 operates in the first operation mode, and the image capture module 120 generates the image data with a first resolution by the infrared photography unit 122. In one embodiment, the image capture module 120 enables the infrared photography unit 122 according to the first notification message, and generates the image data with the first resolution. In an embodiment, the image capture module 120 generates infrared grayscale images by the infrared photography unit 122, and generates full-color images by the color photography unit 124. The image capture module 120 adjusts the resolutions of the infrared grayscale image and the full-color image to the first resolution to generate the image data with the first resolution. The image data with the first resolution includes information of the infrared grayscale images and the full-color images.

Further explaining step 230, in the first operation mode, the infrared photography unit 122 uses the infrared grayscale image captured by the image capture module 120 as the image data and outputs the image data to the computer host PC, and the image data has the first resolution. In some embodiments, the image capture module 120 is switched to generate different image data with different resolutions. In one embodiment, the first resolution is a lower resolution, which also represents a lower amount of data.

In an embodiment, when the computer host PC executes the login procedure, a first bandwidth in the data transmission bandwidth is available for data transmission by the image capture module 120, and the first bandwidth is less than the data transmission bandwidth. In an embodiment, after deducting other occupied bandwidths, the data exchange module 160 currently provides the image capture module 120 with the image data transmission bandwidth which is defined as the first bandwidth.

When execute a known login procedure, if the image capture module 120 provides the image data with higher resolution (such as full-color video), the image data with higher resolution usually cannot be transmitted within a predetermined time based on the first bandwidth. In contrast, in step 230, the image capture module 120 provides the image data with a lower resolution (that is, the image data with the first resolution). Therefore, in the case of data transmission based on the first bandwidth, the image data completes the transmission at the predetermined time, and it is more possible to prevent the communication errors or other serious problems between the image capture module 120 and the computer host PC.

In step 240, when the computer host PC ends the login procedure, the image capture module 120 receives a second notification message provided by the computer host PC. The second notification message informs the image capture module 120 that the computer host PC is going to end the login procedure or is the end.

In step 250, the image capture module 120 is switched to a second operation mode. In step 260, the image capture module 120 operates in the second operation mode, and generates the image data with a second resolution by the color photography unit 124. In one embodiment, the image capture module 120 disables the infrared photography unit 122 and enables the color photography unit 124 according to the second notification message to generate the image data with the second resolution. In one embodiment, the image capture module 120 generates infrared grayscale images by the infrared photography unit 122, and generates full-color images with the color photography unit 124. The image capture module 120 adjusts the resolutions of the infrared grayscale image and the full-color image to the second resolution to generate the image data with the second resolution. The image data with the second resolution includes information of the infrared grayscale images and the full-color images.

Further to describe step 260. In the second operation mode, the image capture module 120 uses the full-color images captured by the color photography unit 124 as the image data to output to the computer host PC, and the image data has the second resolution, and the second resolution is higher than the first resolution. In one embodiment, the actual value of the first resolution or the second resolution is adjustable according to the actual situation.

In detail, when the computer host PC ends the login procedure, the part of the data transmission bandwidth that is not used for transmitting the image data (such as transmitting control information or the audio data) is released. At this time, the second bandwidth in the data transmission bandwidth is available for transmitting the image data. In one embodiment, the second bandwidth is greater than the first bandwidth. In one embodiment, the second frequency bandwidth is the data transmission bandwidth. Thereby, after the login procedure, the display device 100 automatically adjusts the number of pixels of the image data generated by the image capture module 120 from lower to higher. The image capture module 120 is switched from the first operation mode to the second operation mode, that is, the image capture module 120 operates in the full color mode (RGB mode). Therefore, when the computer host PC runs other programs, the image capture module 120 provides the image data with higher resolution to improve the image quality used by other programs.

In an embodiment, the image capture module 120 provides the image data with the first resolution at a first transmission rate in the first bandwidth, and provides the image data with the second resolution at a second transmission rate in a second bandwidth. When the second resolution is higher than the first resolution, and the second bandwidth is greater than the first bandwidth, the second transmission rate is higher than the first transmission rate.

In the above embodiment, executing the login procedure is to start a face recognition program of Windows Hello, and ending the login procedure is to close the face recognition program of Windows Hello, which is not limited herein.

In an embodiment, when the face recognition program of Windows Hello is started or closed, the image capture module 120 uses the color photography unit 124 and operates in the first operation mode or the second operation mode. When starting the face recognition program of Windows Hello, the color photography unit 124 is utilized to generate the image data with low resolution (such as 720p) (that is, the image capture module 120 operates in the first operation mode). When ending the face recognition program of Windows Hello, the color photography unit 124 is utilized to generate the image data with high resolution (such as 1080p) (that is, the color photography unit 124 operates in the second operation mode). Therefore, the image capture module 120 provides the image data with different resolutions (such as the first resolution and the second resolution), and completes the transmission of the image data within a predetermined time under the aforementioned transmission conditions of the first bandwidth and the second bandwidth, which makes the Windows Hello program operate normally.

In an embodiment, when the computer host PC is idle, the data transmission bandwidth between the data exchange module 160 and the image capture module 120 is 480 Mega-bits per second (Mbps). In an embodiment, assuming that the image capture module 120 is allocated to 120 Mbps while performing the above login procedure, and the computer host PC needs to occupy 360 Mbps to transmit data to the image capture module 120. Under the condition, when the image capture module 120 requires a bandwidth more than 148.5 Mbps to transmit the image data, a bandwidth (more than 148.5 Mbps) greater than the available transmission bandwidth (120 Mbps) is required. As a result, the image capture module 120 and the computer host PC cannot communicate successfully, and the computer host PC cannot read the image capture module 120 normally, and the login procedure cannot be performed.

The present disclosure provides a feature that adjusts the actual transmission data volume of the image data generated by the image capture module 120 before or after executing the login procedure, and generates the image data with different resolutions (such as the first resolution or the second resolution) to keep the login procedure operates normally. In an embodiment, the resolution of the image data corresponding to the first resolution is 720p (1280*720), and only 74.25 Mbps transmission bandwidth is required to complete the transmission within a predetermined time. Since the required transmission bandwidth (74.25 Mbps) at this condition is less than the transmission bandwidth (120 Mbps) that required during the login procedure, the image data is successfully transmitted, and the image capture module 120 and the login procedure can be operated normally. After the login procedure, the resolution of the image data of the image capture module 120 is switched to the second resolution for use by the next program or in idle. In an embodiment, the transmission bandwidth required for the image data with the second resolution is 148.5 Mbps, and the resolution of the image data corresponding to the second resolution is 1080p (1920*1080) to provide higher quality images.

Figure 3:
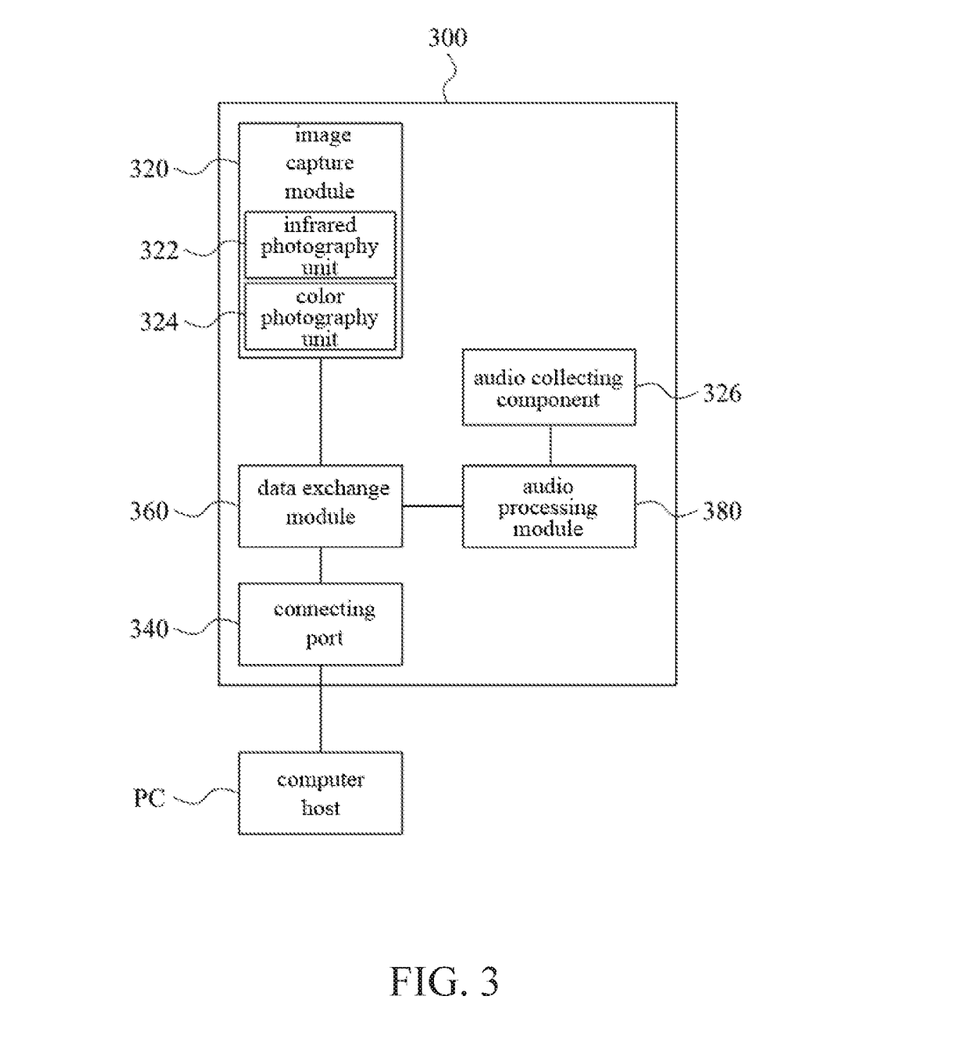
FIG. 3 shows a block diagram of a display device according to an embodiment.

FIG. 3 shows a block diagram of a display device according to an embodiment of the present disclosure. As mentioned above, the actual display device includes more physical structures in some embodiments, such as a display panel or a driving circuit, and the relevant details are not repeated here.

In an embodiment, as shown in FIG. 3, the display device 300 includes an image capture module 320, an audio processing module 380, a connecting port 340, a data exchange module 360, and an audio collecting component 326. In an embodiment, the connecting port 340 is configured to electrically connect the computer host PC. The data exchange module 360 is electrically connected to the image capture module 320, the audio processing module 380, and the connecting port 340, and the audio processing module 380 is further electrically connected to the audio collecting component 326.

The image capture module 320 includes an infrared photography unit 322, a color photography unit 324. As mentioned above, the amount of data of the infrared grayscale image generated by the infrared photography unit 322 is less than the amount of data of the full-color image generated by the color photography unit 324. The details are similar to the foregoing, and is not repeated here.

In an embodiment, the audio collecting component 326 receives voice and generate the audio data. In one embodiment, the audio collecting component 326 is departed with the image capture module 320. In one embodiment, the audio collecting component 326 is a built-in component in the image capture module 320.

The audio processing module 380 is electrically connected to the audio collecting component 326 and is configured to perform audio processing on the audio data provided by the audio collecting component 326.

When executing certain programs, the image capture module 320 and the audio processing module 380 are used together. The computer host PC enables the audio collecting component 326, continuously receives voice to generate the audio data, and activates the face recognition program of Windows Hello at the same time. Meanwhile, since the communication between the audio processing module 380 and the computer host PC occupies part of the data transmission bandwidth, the transmission bandwidth between the image capture module 320 and the computer host PC is decreased, which may cause the image data transmitted incompletely within a predetermined time, or even cause operation errors of related programs (such as Windows Hello).

Figure 4A:
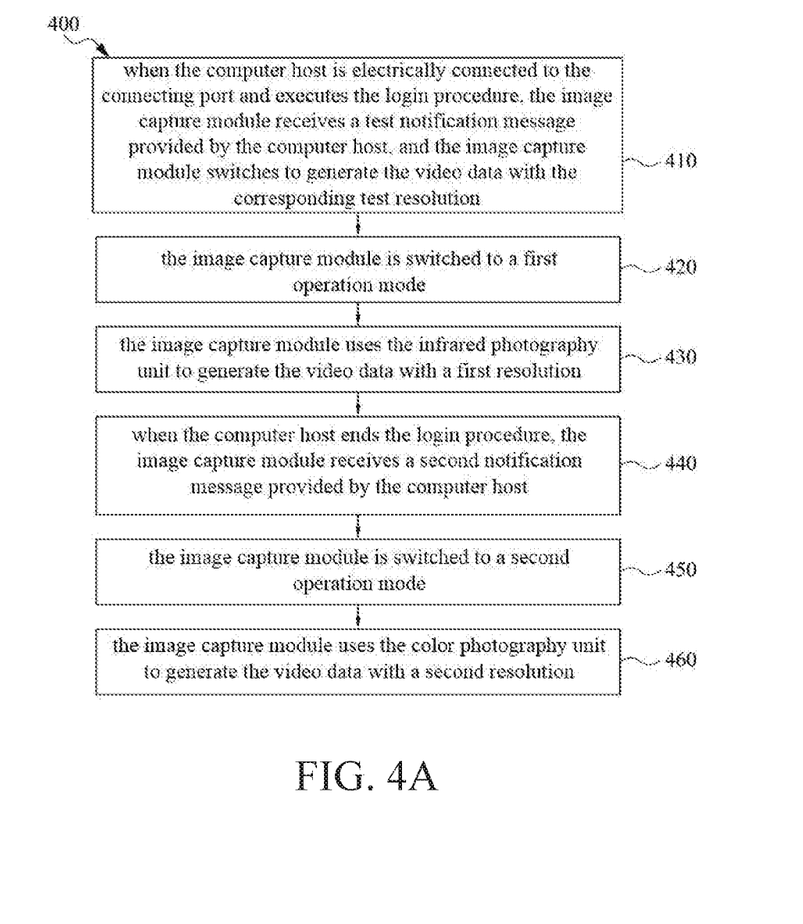
FIG. 4A shows a flowchart of a controlling method of an embodiment.

Please refer to FIG. 4A. FIG. 4A shows a flowchart of a controlling method of an embodiment of the present disclosure.

As shown in FIG. 4A, in step 410, when the computer host PC is electrically connected to the connecting port 340 and executes the login procedure, the image capture module 320 receives a test notification message provided by the computer host PC, and the image capture module 320 generates the image data with the corresponding test resolution. In an embodiment, the test notification message indicates a preset sequence. The image capture module 320 generates a plurality of test image data corresponding to different test resolution according to the preset sequence.

In one embodiment, the preset sequence is the sequence of the test resolution from high to low, so the image capture module 320 sequentially generates the corresponding test image data from high to low resolution. When the image capture module 320 successfully transmit one of the test image data, the image capture module 320 defines the test resolution corresponding to the current test image as the first resolution. In the embodiments shown in FIGS. 4A and 4B, the preset sequence is the sequence of the test resolution from low to high, so the image capture module 320 generates the corresponding test image data in sequence from low to high resolution, and for more detailed steps of defining the first resolution through a plurality of test images, see FIG. 4B and the following description.

In addition, in an embodiment, the image capture module 320 generates a plurality of test image data according to a test notification message. In an embodiment, the image capture module 320 sequentially receives a plurality of different test notification messages, and then sequentially generates a plurality of corresponding test image data according to the different test notification messages.

Figure 4B:
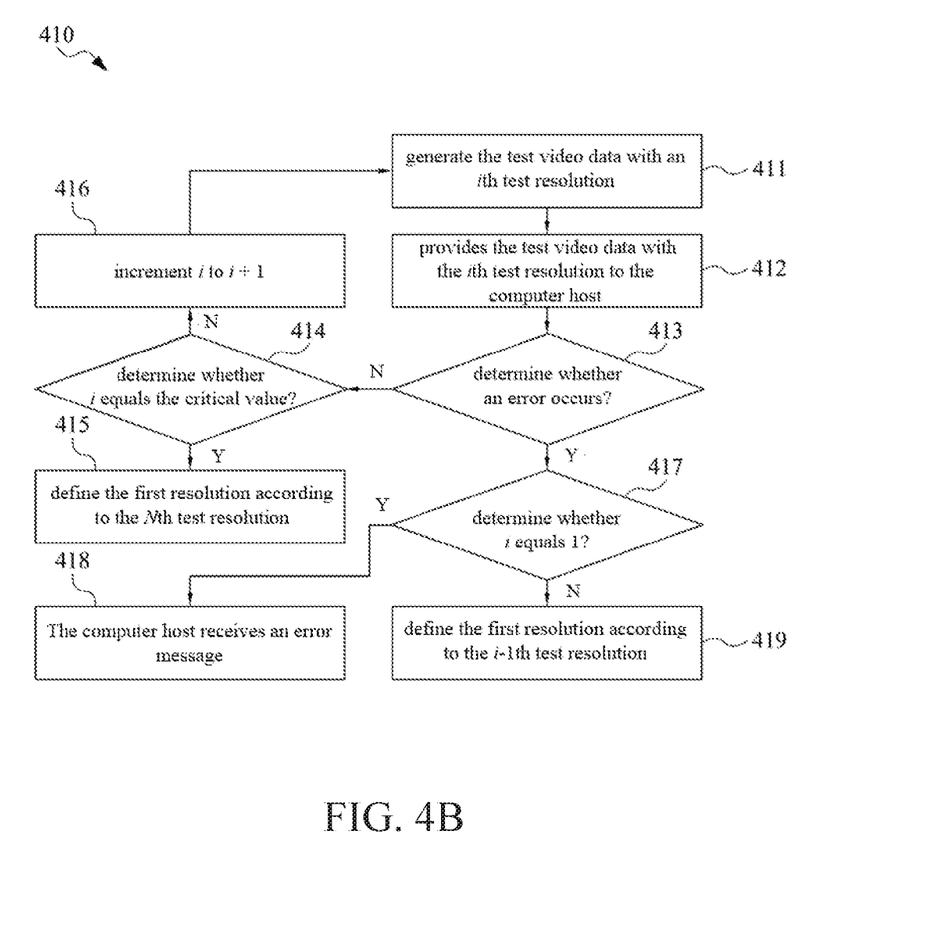
FIG. 4B shows a flowchart of some steps in the method according to FIG. 4A.

Please refer to FIG. 4B together, step 410 further includes multiple steps 411, 412, 413, 414, 415, 416, 417, 418, and 419.

In step 411, the image capture module 320 generates the test image data with an ith test resolution, wherein i is a positive integer variable that is not greater than a critical value N and not less than 1. The threshold N is a positive integer constant preset by the image capture module 320, and the threshold N is the maximum resolution of the image data that the image capture module 320 can generate when the computer host PC executes the login procedure. In the embodiment shown in FIG. 4A and FIG. 4B, the preset sequence refers to the test resolution is ordered from low to high, and the initial value of i is 1. The larger the value of i, the higher the corresponding the ith test resolution.

As mentioned above, for example, the image capture module 320 generates a plurality of test image data corresponding to different test resolutions according to one or more of the test notification messages provided by the computer host PC. In one embodiment, the image capture module 320 generates multiple test image data corresponding to different test resolutions according to multiple test notification messages provided by the computer host PC, and the image capture module 320 generates multiple corresponding test image data in sequence according to the preset sequence from low to high resolution.

In step 412, the image capture module 320 provides the test image data with the ith test resolution, and transmits the test image data to the computer host PC through the data exchange module 360. In one embodiment, each of the test image data is the infrared grayscale image generated by the infrared photography unit 322 described above. In one embodiment, each of the test image data is a full-color image generated by the color photography unit 324 described above. In one embodiment, the plurality of the test image data are the infrared grayscale images generated by the infrared photography unit 322 or the full-color images generated by the color photography unit 324. In one embodiment, the test image data is the image data including infrared grayscale images and full-color images, and the resolution of at least one of the infrared grayscale images and the full-color images is adjusted accordingly.

In an embodiment, in step 413, the image capture module 320 determines whether an error occurs or not. The image capture module 320 calculates or obtains a transmission time for transmitting the test image data with the ith test resolution to the computer host PC, and determines whether the transmission time is greater than a threshold value. When the transmission time is greater than the threshold, the image capture module 320 determines that an error has occurred. In one embodiment, in step 413, the computer host PC determines whether an error occurs or not. The computer host PC determines whether a preset conditions (such as the transmission time, data volume, other similar parameters or a combination thereof preset in the image data of the image capture module 320) is met or not according to the test image data received with the ith test resolution (such as the transmission time, data volume, other similar parameters or a combination thereof of the test image data during the actual operation). When the test image data does not meet the preset conditions (for example, any one of the parameters does not meet the corresponding preset conditions), the computer host PC determines that an error has occurred. At this time, the computer host PC informs the image capture module 320 the aforementioned error information.

When the determination result of step 413 is that no error occurs, perform step 414, otherwise perform step 417.

In step 414, the image capture module 320 or the computer host PC determines whether i equals the critical value N or not, and determines whether the ith test resolution has reached the maximum resolution (that is, the resolution corresponding to the critical value N) of the image data that the image capture module 320 can produce.

When the determination result of step 414 is that the ith test resolution has reached the maximum resolution (that is, i equals the critical value N), perform step 415, otherwise, perform step 416.

In step 415, when the determination result in step 413 is that no error occurs and the determination result in step 414 is i equals N, it means that any one of the test resolutions (resolution corresponding to any value i) can be the maximum resolution (resolution corresponding to the critical value N). In other words, any resolution can be used under the current transmission bandwidth provided to the image capture module 320 by the data exchange module 360. That is, the image data with any resolution is successfully transmitted in the first bandwidth.

Following the above description, in an embodiment, in step 415, the image capture module 320 or the computer host PC defines the first resolution according to the Nth test resolution, so as to use a higher resolution image. In an embodiment, in step 415, the image capture module 320 or the computer host PC defines the first resolution according to the N-1th test resolution to facilitate implementation. In practice, the step of defining the first resolution according to the N-1th test resolution, means that the first resolution is defined as the N-1th resolution.

In step 416, increase i to i+1. Step 416 does not necessarily involve an actual action. In an embodiment, when entered into step 411 from step 416, it represents that the image capture module 320 is switched to provide a test image with a higher test resolution (compared to the ith resolution).

In step 417, the image capture module 320 or the computer host PC determines whether i equals 1. When the determination result of step 413 is that an error occurs and i equals 1, it means that the test image data dose not operate normally at the initial minimum test resolution (the corresponding i is 1). In other words, when the test image data dose not operate normally at the lowest resolution, all other resolutions are not applicable to the transmission bandwidth provided by the data exchange module 360 to the image capture module 320.

When the determination result of step 417 is i, perform step 418, otherwise, perform step 419.

The computer host PC receives an error message in step 418. In some embodiments, the computer host PC receives the error message transmitted from the image capture module 320. In some embodiments, the computer host PC generates the error message by itself and the error message is used to indicate that all the test resolutions are not applicable to the current bandwidth provided by the data exchange module 360 to the image capture module 320 which is available to be used to transmit the image data.

In step 419, the image capture module 320 or the computer host PC defines the first resolution according to the i-1th test resolution. As mentioned above, the first resolution is defined as the i-1th test resolution.

Furthermore, when the first resolution is defined in step 415 or step 419, the computer host PC stores the first resolution. Therefore, when the computer host PC re-executes the login procedure, it does not perform step 410, but performs step 420. Therefore, the image capture module 320 generates the image data with the first resolution according to the first notification message received from the computer host PC. In this way, the computer host PC and the display device 300 do not need to repeat testing the obtained suitable resolution, thereby improving the operating performance of the login procedure. In one embodiment, the image capture module 320 stores the first resolution defined above, so that when the computer host PC executes the login procedure again, the image capture module 320 provides the first resolution information for the computer host PC to use, thereby skipping step 410 and performing step 420.

Returning to FIG. 4A, steps 420, 430, 440, 450, and 460 respectively correspond to and are the same as steps 220, 230, 240, 250, and 260 shown in FIG. 2. Thus, after prior to performing the login procedure, the image capture module 320 switches to generate the image data with different resolution.

In an embodiment, when the computer host PC is idle, the data transmission bandwidth between the data exchange module 360 and the image capture module 320 is 240 Mega-bits per second (240 Mbps), and the data transmission bandwidth between the data exchange module 360 and the audio processing module 380 is 240 Mega-bits per second. In an embodiment, when performing the login procedure, the image capture module 320 is assigned 80 Mbps, the audio processing module 380 is assigned 80 Mbps, and the computer host PC needs 240 Mbps to transfer data with the image capture module 320. At this time, assuming that the image capture module 320 requires a bandwidth of more than 148.5 Mbps to transmit the image data, the image capture module 320 requires a transmission bandwidth (above 148.5 Mbps) that is greater than the available transmission bandwidth (80 Mbps), which results that the image capture module 320 cannot successfully communicating with the computer host PC, thereby causing the computer host PC cannot read the image capture module 320 normally further to perform the login procedure successfully. Through the method 400, the actual amount of transmitted data of the image data generated by the image capture module 320 before and after executing the login procedure is adjustable, so that the login procedure is operated normally. In some examples, the transmission bandwidth required by the image data with the first resolution is 74.25 Mbps, and the resolution of the image data corresponding to the first resolution is 720p (1280*720). As the required transmission bandwidth (74.25 Mbps) is less than the transmission bandwidth (80 Mbps) for the login procedure, the image capture module 320 and the login procedure operate normally. At the end of the login procedure, the resolution of the image data of the image capture module 320 is switched to another higher resolution, that is, the resolution of the image data is adjusted to the second resolution for the next program or when idle. In an embodiment, the data amount of the image data having the second resolution is 148.5 Mbps, and the resolution of the image data corresponding to the second resolution is 1080p (1920*1080).

In summary, the display device and the controlling method described in the disclosure transmits the image data in a limited transmission bandwidth (such as the first bandwidth when the login procedure was performed as described above) completely by switching the image capture module to generate the image data with a smaller amount of data (such as infrared grayscale images, or adjusting from a high resolution to a low resolution). On the other hand, at the end of the login procedure, the image data can be adjusted to provide a lower amount of data (for example, switching to full-color video generation, or from low resolution to high resolution). Therefore, when the login procedure is executed, the computer host detects corresponding electronic devices such as the image capture module and the audio processing module normally, and thus the login procedure can operate normally. In addition, when other applications are executed, the image specifications of the applications are still complied.

Based on the above, a display device and its controlling method, which integrate photography functions into a display, are provided. The computer host utilize the aforementioned display for face recognition procedures without installing additional photography components. On the other hand, in actual implementation, the display device and the controlling method provided herein configure to transmit images or other data successfully without errors in related programs with operating system limitations.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A display device, comprising:
   a connecting port, for electrically connecting to a computer host;
   an image capture module, for generating a image data; and
   a data exchange module, electrically connected between the image capture module and the connecting port, the data exchange module has a data transmission bandwidth;
   wherein, when the computer host is electrically connected with the connecting port and executes a login procedure, the image capture module generates the image data with a first resolution;
   when the computer host ends the login procedure, the image capture module is switched to generate the image data with a second resolution,
   wherein the first resolution is lower than the second resolution;
   wherein, when the computer host is electrically connected with the connecting port and executes the login procedure, the image capture module is further switched to generate a plurality of test image data according to a test notification message provided by the computer host, the test image data has a plurality of different test resolutions, and the image capture module provides the test image data to the computer host according to a preset sequence.

2. The display device according claim 1, wherein when the computer host executes the login procedure, the image capture module is switched to generate the image data with the first resolution according to a first notification message provided by the computer host; and
   when the computer host ends the login procedure, the image capture module is switched to generate the image data with the second resolution according to a second notification message provided by the computer host.

3. The display device according claim 1,
   wherein, when the preset sequence is an order of the test resolutions from low to high and the image capture module dose not successfully transmit one of the test image data, the image capture module defines the first resolution as one of the test resolutions corresponding to a previous one of a current one of the test image data;
   wherein, when the preset sequence is the order of the test resolutions from high to low and the image capture module successfully transmits one of the test image data, the image capture module defines the first resolution as one of the test resolutions corresponding to the current one of the test image data.

4. The display device according claim 3, wherein when the image capture module defines the first resolution as one of the test resolutions, the image capture module records the first resolution; when the computer host re-executes the login procedure, the image capture module generates the image data with the first resolution.

5. The display device according claim 1, further comprising an audio collecting component and an audio processing module, the audio processing module is electrically connected between the audio collecting component and the data exchange module, the audio processing module is configured to perform audio processing on an audio data provided by the audio collecting component;

wherein, the audio processing module is configured to provide the audio data performed the audio processing to the computer host by the data exchange module.

6. The display device according claim 2, wherein when the image capture module receives the first notification message, the image capture module enables an infrared photography unit of the image capture module; and     when the image capture module receives the second notification message, the image capture module enables a color photography unit of the image capture module.

7. A controlling method, applied in a computer host and a display device, wherein the display device includes a connecting port, an image capture module, and a data exchange module, the connecting port is configured to electrically connected with a computer host, the data exchange module is electrically connected between the image capture module and the connecting port, the data exchange module has a data transmission bandwidth, the controlling method comprises steps of:

generating image data with a first resolution by the image capture module when the computer host is electrically connected to the connecting port and executes a login procedure; and     generating the image data with a second resolution by the image capture module when the computer host ends the login procedure;

wherein the first resolution is lower than the second resolution;

wherein when the computer host is electrically connected to the connecting port and executes the login procedure, the image capture module generates test image data with different test resolutions according to a test notification message provided by the computer host, and the image capture module provides the test image data to the computer host according to a preset sequence.

8. The controlling method according claim 7, wherein the step of when the computer host executes the login procedure further comprises:

the image capture module generates the image data with the first resolution according to a first notification message provided by the computer host;

wherein the step of when the computer host ends the login procedure further comprises:

the image capture module generates the image data with the second resolution according to a second notification message provided by the computer host.

9. The controlling method according claim 8, wherein the step of when the computer host executes the login procedure further comprises:

when the image capture module cannot successfully transmit one of the test image data, the image capture module defines the first resolution as a test resolution corresponding to a previous one of a current one test image data; or     when the image capture module successfully transmit one of the test image data, the image capture module defines the first resolution as a test resolution corresponding to the current one of the test image data.

10. The controlling method according claim 9, wherein when the image capture module defines the first resolution as one of the test resolutions, the image capture module records the first resolution; and when the computer host re-executes the login procedure, the image capture module generates the image data with the first resolution.

11. The controlling method according claim 8, further comprising:

enabling an infrared photography unit of the image capture module by the image capture module when the image capture module receives the first notification message; and     enabling a color photography unit of the image capture module by the image capture module when the image capture module receives the second notification message.

* * * * *